July 22, 1952  W. E. P. JOHNSON  2,604,278
GAS TURBINE AIRCRAFT PROPULSION INSTALLATION
WITH AUXILIARY AIR INTAKE
Filed Oct. 12, 1945  4 Sheets-Sheet 2
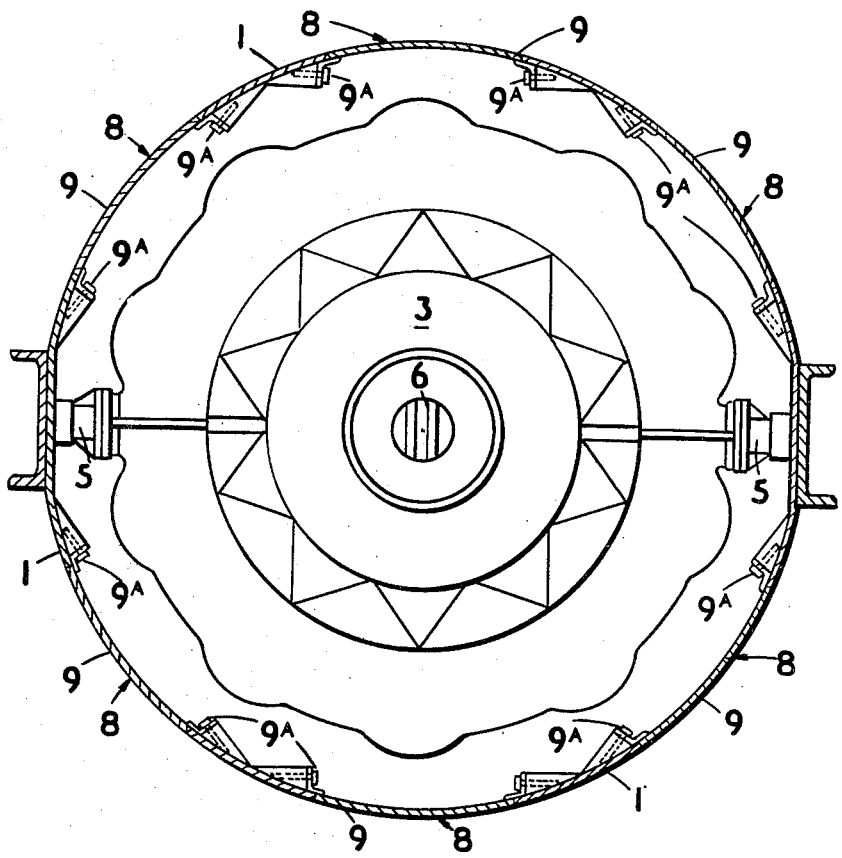
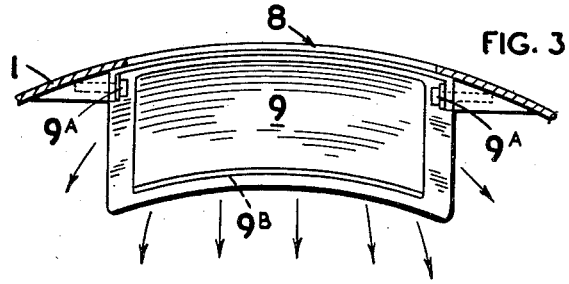
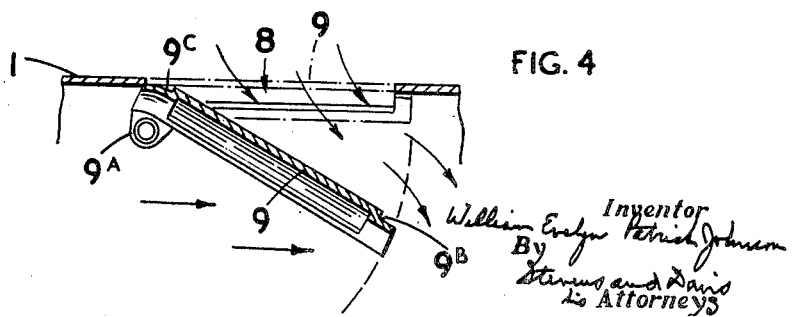

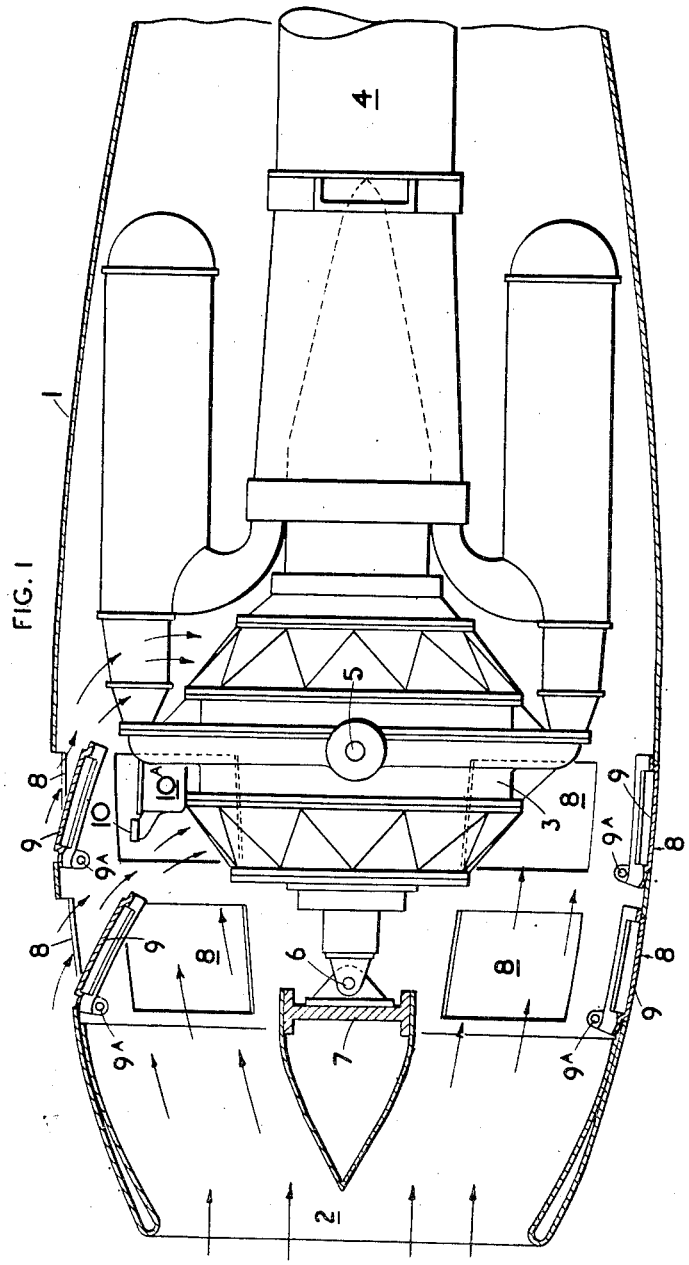

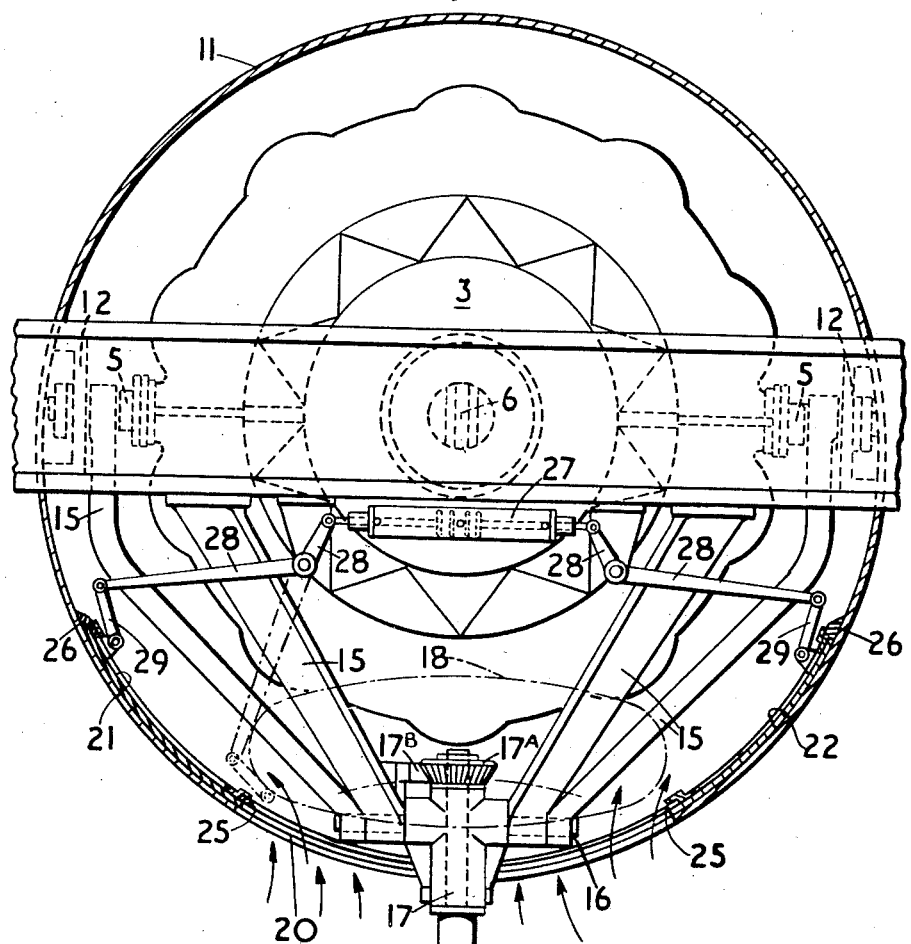

Patented July 22, 1952

2,604,278

UNITED STATES PATENT OFFICE 2,604,278

GAS TURBINE AIRCRAFT PROPULSION INSTALLATION WITH AUXILIARY AIR INTAKE

William Evelyn Patrick Johnson, Hampstead, London, England, assignor to Power Jets (Research & Development) Limited, London, England Application October 12, 1945, Serial No. 621,973
In Great Britain July 2, 1943

Section 1, Public Law 690, August 8, 1946
Patent expires July 2, 1963

4 Claims. (Cl. 244—53)

This invention relates to aircraft installations of the kind in which a compressor and gas turbine combination (for convenience herein referred to as a "combustion turbine") forms the motive source for jet propulsion or combined jet and airscrew or like propulsion. Power units of this class are for practical purposes installed in nacelles or fuselages (which for the purpose of description will be referred to collectively as nacelles) arranged with forwardly facing intakes for air so that a useful degree of ram pressure due to forward speed is applied in flight at the air intakes of the unit. When there is substantial forward speed there is within such nacelle a pressure higher than the ambient atmospheric pressure. The invention is concerned with such installations, when it is intended that the ram pressure should be an important factor contributing to performance. It is found as a matter of design that whilst the forwardly facing air intake may be adequate in conditions of flight and the contours surrounding it can be aerodynamically appropriate, there is a tendency for the condition to arise either in the stationary case or at low forward speeds, for example during takeoff, for a depression to arise in the nacelle which has an adverse effect on performance. The invention is intended to afford means for overcoming this difficulty and in some cases also to give subsidiary advantages, for example in regard to accessibility or in regard to undercarriage problems. The invention therefore refers to aircraft propulsion installations of the kind in which the power unit is enclosed in a nacelle which is intended to be substantially pressure-tight in most conditions of flight, and in which high ram efficiency is required and in which there may be a tendency for depression to occur in the nacelle in other conditions, which depression is deleterious to performance and may incidentally give rise to undue heating because of absence of thorough ventilation.

According to the invention, in an aircraft propulsion installation of the kind specified provision is made in the wall of the nacelle of one or more openings for the admission of air for consumption in the power unit and means to close these openings in appropriate circumstances of flight; such circumstances broadly speaking will arise simply by gaining adequate forward speed. The closures for the openings may be valve-like and adapted to close automatically when the ram pressure in the nacelle reaches a certain order of value relative to the ambient atmospheric pressure, and to this end they may be partly operated by gravity or by spring-loading. Alternatively the closures may be so inter-connected with the retractable undercarriage mechanism of the aircraft or with the operating system of such mechanism as to be open when the undercarriage is extended and closed when it is retracted. In any case the closures are preferably so arranged that they tend to be sealed against the escape of air from the nacelle by the pressure difference through the nacelle wall. The openings, or some of them, may be arranged so as to give ready access to selected regions or parts within the nacelle, e. g. for the inspection or servicing of parts of the power unit such as filters. In a case where a closure is connected with undercarriage mechanism the opening with which it is associated may serve as the embrasure which accommodates the retraction and extension of the undercarriage, and the closure constitutes what is normally called the undercarriage door.

The invention will now be described with the aid of the accompanying diagrammatic drawings, by way of example. In these drawings Fig. 1 is a sectional view through a nacelle giving an indication of the power unit within it, Fig. 2 is a similar section taken across the axis of the power unit, Fig. 3 is a fragmentary view showing one of the closure elements seen from the axial direction, and Fig. 4 a similar drawing of the same closure, inside elevation.

Fig. 6 is an axial view of the same, and

Figure 5:
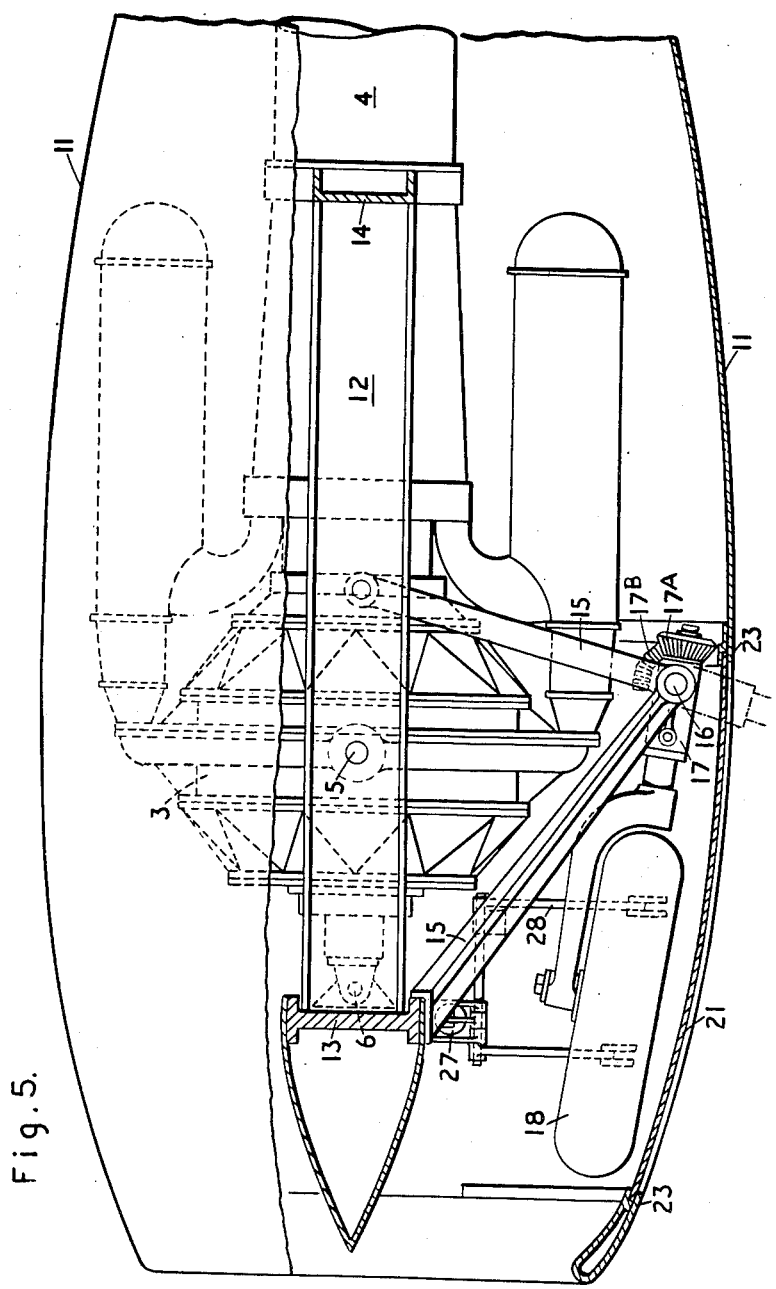
Fig. 5 is again a side elevation partly in section showing the arrangement of a power unit in a nozzle which also includes a retractable undercarriage.

Figs. 7 and 8 fragmentary views of details of the sealing of the closure, which also serves as the undercarriage door.

Turning first of all to Figs. 1 to 4, the nacelle is shown with a skin or wall 1, having a forwardly facing main air entry indicated at 2, and within the nacelle there is mounted a combustion turbine power unit of the Whittle type having a compressor 3 and exhaust pipe 4. This unit is mounted in known manner on horizontally projecting trunnion mountings 5 with a third anchorage point at 6 to a spar 7. It will be noted that the nacelle is circular in section in view of the fact that it must withstand substantial loads arising from internal pressure. In the wall or skin 1 of the nacelle, air entry openings are provided at 8 and with each of these there is associated a valve-like closure 9 in the nature of a trap door. The openings 8 are arranged in the zone around the compressor 3 and are intended to be sufficiently large virtually to obviate any possibility of an internal depression in the worse cases, i. e. when the engine is running with maximum air consumption, the aircraft being stationary. They may be so arranged as to tend to direct the incoming air in the general direction of the two air intakes of the compressor, such general direction being indicated by the flow arrows in Fig. 1. The closures 9 are so contrived that whilst they are hinged for opening and have their edges made in such a way that the closures are virtually flush with the external surface of the nacelle when closed, they nevertheless conform with the circular and other curvature of the nacelle. Each closure is therefore made with the appropriate curvature of its main surface and each is mounted for hinging on an axis which permits its opening inwardly, having somewhat inwardly extending hinge lugs 9A for this purpose. The edges of each closure are formed so as to achieve the required flush exterior when closed, the nature of the formation being visible, for example, in Fig. 4 where a step is formed at 9B so that the closure can seal with a good seat against the edge of the opening 8 whilst the step along the edge adjacent to the hinged axis at 9C is made arcuate to permit swinging. The actual seating surface may be provided with rubber strip or like means to ensure a good seal. The closures may be quite free on their hinges if it be found in any given case that the pressure conditions are sufficiently marked to ensure their closing and remaining closed under the influence of ram pressure whilst opening when there is internal depression. In other cases, however, it may be found expedient nearly or completely to mass balance the closures about their hinged axes and to provide light spring opening tendency, since by this means the effects of high gravitational loads in flight which might tend to open some of the closures can be avoided. It can be seen from Fig. 1 that at least one of the openings 8 can be arranged to afford access to the interior, in this case to the filler cap 10 of oil tank indicated at 10A. It will of course be apparent to those acquainted with the art, that the openings 8 may be required to be reinforced round their margins for structural reasons.

Turning to Figs. 5 to 8, the case here is one in which the required opening for air is provided also as the undercarriage embrasure. The nacelle skin is here shown at 11 and the general arrangement of the power unit within it is as before. The trunnion mountings of the unit being supported on strong fore and after members 12 which extend between the front spar 13 and rear spar 14. The main undercarriage structure is also supported from these members and comprises suitable framework 15 forming a rigid volume frame to the lower part of which is pivotted at 16 an undercarriage leg 17 carrying a wheel 18. The leg includes a rotating spindle and at its upper end this has a bevel pinion 17A engaging a bevel rack 17B, fixed with the structure 15, to the effect that as the undercarriage is retracted and extended the plane of the wheel 18 is rotated through approximately 90 degs. The fact that a jet propulsion aircraft lends itself to the use of exceptionally short undercarriage legs facilitates a construction of this type and may enable the undercarriage to be stowed within such a nacelle as that depicted. The undercarriage is presumed to be operated by any suitable means such as a hydraulic jack.

The undercarriage embrasure can be seen in Fig. 6 at 20. Two sliding doors are provided at 21, 22, respectively, these constituting not only undercarriage doors but airtight closures to the opening 20 when the undercarriage is fully retracted. Here again the closures are curved so as to conform with the circular section of the nacelle and the panels forming the closures are in the nature of sliding panels, the forward and rearward edges of which are guided by running in grooves indicated at 23. The meeting edges are provided with sealing means illustrated in Fig. 8, each constituted by a channel member 24 which serves to stiffen the edge of the panel and also to retain a rubber or other like sealing element 25 which constitutes as can be seen in the drawing, a tongue and groove seal which, whilst not being susceptible to jamming or sticking, will at the same time tend to be improved, as an airseal, by internal pressure. The remaining edge of each panel is also provided with a sealing strip in the form of an attached strip 26 of rubber or the like, which slides on the skin 11 when the panel is moving and which tends to seal under pressure. The two closure panels 21 and 22 are operated by an opposed piston hydraulic jack 27 and rods of which move bell cranks 28, which are connected to the closures by links 29, this mechanism being duplicated or repeated as may be necessary lengthwise, in view of the comparative length and probable flexibility of the panels themselves. It is intended that the jack 27 shall be operated as a double acting jack by a system which is precisely analogous to that applicable in the ordinary case of undercarriage doors, that is to say, complete opening of the closures proceeds to operation of undercarriage extension whilst the doors only begin to close after complete undercarriage retraction. In view of the particular kind of construction proposed and the fact that the doors themselves will be well supported and must be fairly robust when closed, it may be found that in such a case the provision of undercarriage uplocks may be omitted, reliance being placed upon the doors themselves for preventing drooping of the undercarriage in flight.

It is to be understood that in this application of the invention it is conceived to be likely that all the circumstances in which the additional air opening is required, correspond with the circumstances in which the undercarriage would normally be extended; it is of course evident that in normal practice the undercarriage is extended during preliminary running up on the ground and during take-off, and these are the most important phases in which nacelle depression is liable to arise. There is another case where depression is to be avoided, namely: when, during a landing it is found necessary to make full use of engine power, and here again the practical condition will normally be, with the undercarriage extended.

I claim:

1. An aircraft propulsion installation comprising a combustion gas-turbine-compressor group of which the compressor supplies air to the turbine for combustion purposes, a compartment having a wall enclosing said gas turbine group including the air intake of said compressor and itself having an atmospheric air entry of constant section constituting a main entry for air to said compressor, said main entry being forwardly facing to be subject to ram effect and being so dimensioned relatively to the air demand of said group as to permit alone a flow therethrough such that in conditions of normal flight and power output said compartment is internally pressurized due to said ram effect, but under a condition of low ram effect combined with a high power output is subject to internal depression due to the air demand of said group, said compartment having in its wall a further atmospheric air entry constituting an auxiliary entry for air to said compressor independently of said main entry, and means to open and close said auxiliary entry, said auxiliary entry when open being effective to reduce the incidence of said internal depression.

2. An aircraft propulsion installation comprising a combustion gas-turbine-compressor group of which the compressor supplies air to the turbine for combustion purposes, a compartment having a wall enclosing said gas turbine group including the air intake of said compressor and itself having an atmospheric air entry of constant section constituting a main entry for air to said compressor, said main entry being forwardly facing to be subject to ram effect and being so dimensioned relatively to the air demand of said group as to permit alone a flow therethrough such that in conditions of normal flight and power output said compartment is internally pressurized due to said ram effect, but under a condition of low ram effect combined with a high power output is subject to internal depression due to the air demand of said group, said compartment having in its wall a further atmospheric air entry constituting an auxiliary entry for air to said compressor independently of said main entry, and means operatively dependent upon the pressure in said compartment to open and close said auxiliary entry in said compartment wall independently of said main entry so that the said auxiliary entry is opened to admit an additional supply of air when a depression exists in said compartment and is completely closed when the ram effect is sufficient to internally pressurize said compartment.

3. An aircraft propulsion installation, comprising a combustion gas turbine-compressor group, a compartment, enclosing the air intake of said compressor and itself having an atmospheric air entry constituting a main entry for air to said compressor, said main entry being forwardly facing to be subject to ram effect and being so dimensioned relative to the air demand of said group as to permit alone a flow therethrough such that in conditions of normal flight and power output said compartment is internally pressurized due to said ram effect, but under a condition of low ram effect combined with a power output above the idling value is subject to internal depression due to the air demand of said group, said compartment having also a further atmospheric air entry constituting an auxiliary entry for air to said compressor, and means operatively dependent upon the operation of a retractable undercarriage to open and close said auxiliary entry, the entry being open when the undercarriage is unretracted and closed when it is retracted.

4. An installation according to claim 3 wherein said means to open and close the auxiliary entry comprise undercarriage doors and the undercarriage is adapted to be housed in the compartment when retracted.

WILLIAM EVELYN PATRICK JOHNSON.

REFERENCES CITED

The following references are of record in the file of this patent:

UNITED STATES PATENTS

| Number | Name | Date |
| --- | --- | --- |
| 1,329,480 | Sherbondy | Feb. 3, 1920 |
| 1,585,281 | Craddock | May 18, 1926 |
| 1,802,915 | Hicks | Apr. 28, 1931 |
| 2,158,270 | Browne | May 16, 1939 |
| 2,280,835 | Lysholm | Apr. 28, 1942 |
| 2,283,694 | Perrine | May 19, 1942 |
| 2,405,723 | Way | Aug. 13, 1946 |
| 2,409,446 | Pavlecka et al. | Oct. 15, 1946 |
| 2,501,633 | Price | Mar. 21, 1950 |